United States Patent [19]

Schwarz

[11] 3,899,160
[45] Aug. 12, 1975

[54] BUFFER

[75] Inventor: Wilhelm Schwarz, Wilhelmshaven, Germany

[73] Assignee: Fried. Krupp Gesellschaft mit beschrankter Haftung, Essen, Germany

[22] Filed: Mar. 21, 1974

[21] Appl. No.: 453,560

[30] Foreign Application Priority Data

Mar. 22, 1973 Germany............................ 2314275

[52] U.S. Cl. .............................................. 267/152
[51] Int. Cl................................................. F16f 3/08
[58] Field of Search .......... 267/152, 153, 140, 141, 267/63 R; 173/139; 61/53, 53.5

[56] References Cited
UNITED STATES PATENTS 2,678,796   5/1954   Roy..................................... 267/152
3,552,501   1/1971   Weiss.................................. 173/139

Primary Examiner—James B. Marbert
Attorney, Agent, or Firm—Walter Becker

[57] ABSTRACT

A buffer, especially for cranes, which includes a top plate and a bottom plate confining therebetween a plurality of discs of circular elastic material which are bonded to each other and to the head and foot plate while a holding member extends through passages in the plates located between the head and foot plate and is connected to the head and foot plate, the internal plates between the head plate and foot plate are provided with axially aligned passages the inner diameter of which is a multiple of the thickness of the holding member.

5 Claims, 2 Drawing Figures

BUFFER

The present invention relates to buffers. The employment of buffers which are formed by sticking together discs of cellular elastic material is exposed to the risk that due to stresses to which the buffers are subjected, the adhesive connection between adjacent discs becomes loose and that dropping discs cause accidents. This applies for instance to buffers on cranes.

It is, therefore, an object of the present invention to eliminate the abovementioned danger in connection with the manufacture of buffers of the general type referred to above. This object and other objects and advantages of the invention will appear more clearly from the following specification in connection with the accompanying drawing illustrating an axial section through a buffer according to the invention.

The buffer according to the present invention which is formed of a plurality of discs placed one against the other and made of cellular elastic material while in the interior of the buffer a tension member is provided which connects the foot plate with a head plate, is characterized primarily in that for passing the tension member from the foot plate to the head plate, the discs between said foot plate and head plate are provided with openings the clear width of which is a multiple of the thickness of the tension member.

A buffer according to the invention has the advantage that the individual discs of the buffer with the exception of the head plate can easily be composed and if necessary exchanged since they are not firmly connected with the tension member.

Figure 1:
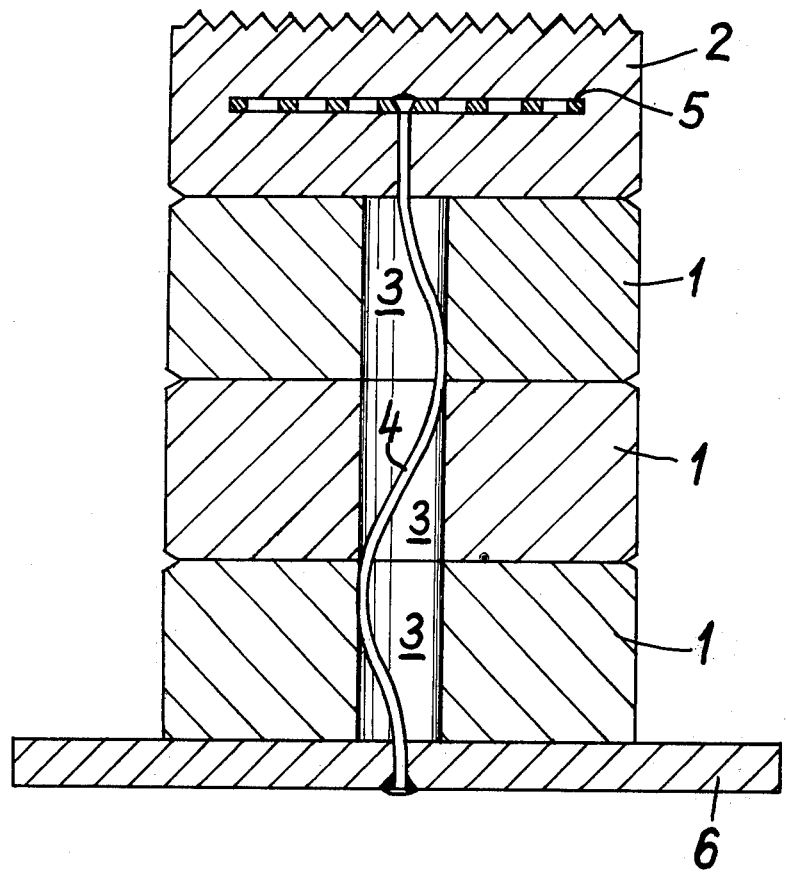

Referring now to the drawing in detail, the buffer is formed by a plurality of cellular discs 1 and a cylindrical head plate 2 as well as a foot plate 6. The discs 1 and the head plate 2 consist of a cellular material for instance foamed polyurethane while said plates engage each other along the end faces and are connected at their end faces and to the foot plate 6 by an adhesive substance. The disc 1 have cylindrical axially arranged openings 3 through which a cable 4 is passed (see FIG. 1) while having one end connected to a relatively thin perforated plate 5 which is located within the head plate 2 in parallel arrangement to the lateral surfaces thereof. Expediently, the perforated plate 5 is during the manufacture of the head plate 2 foamed together with the adjacent end of the cable 4 so that the plate 4 will be embedded in the foamed synthetic material.

The other end of the cable 4 is passed through a central bore of the foot plate 6 which latter has that side thereof which faces way from the disc 1 welded or soldered to said other end of cable 4.

Figure 2:
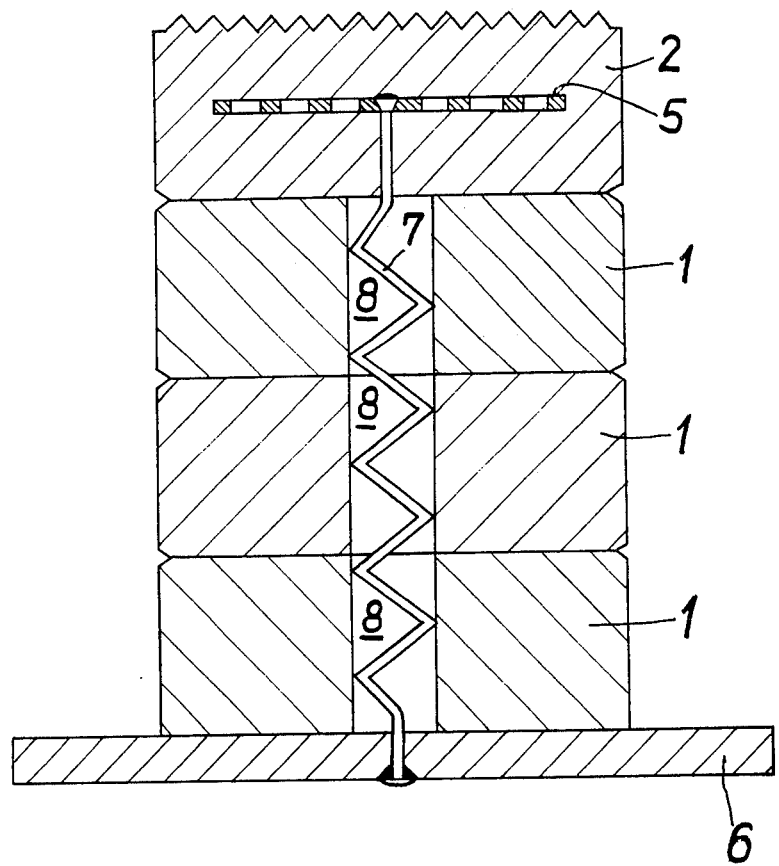

The diameter of the openings 3 is a multiple for instance 5 times that of the diameter of the cable 4. The length of this cable between the head plate 2 and the foot plate 6 is greater than the total axial extension of the openings 3 in unloaded condition of the buffer. Consequently, the cable 4 is curved. Preferably there forms a longitudinal helix or undulated cable with at least one undulation. The cable is so dimensioned that it will be able to support the weight of the entire buffer body 1, 1, 1, 2 with at least a five time safety. Instead of the cable 4, also any other rigid pull element for connecting the head plate 2 with the foot plate 6 may be employed, for instance a thin band 7 (see FIG. 2) of steel or synthetic material. Such band may likewise be undulated within the openings of the disc of the buffer. However, it is also possible that it is bent within said openings in a bellows-like manner while said openings 8 may be designed in the form of slots with rectangular cross section; see FIG. 2.

When the head plate 2 or one of the discs 1 becomes detached from the disc or the foot plate 6, these buffers are prevented by the cable 4 from dropping so that no accident danger will exist.

It is, of course, to be understood that the present invention is, by no means, limited to the specific showing in the drawing but also comprises any modifications within the scope of the appended claims.

It may be added that while any suitable adhesive may be used for connecting the disks 1 to each other and to the plates 2 and 6, for example an adhesive consisting of polyurethane has proved very satisfactory in this connection.

What I claim is:

1. A buffer which includes: a first end plate, a second end plate arranged in substantially spaced relationship to said first end plate, a plurality of discs of cellular elastic material interposed between and bonded to said first and second end plates and also bonded to each other, said discs respectively being provided with axial passages substantially axially aligned with each other, and a holding member extending through said passages and interconnecting said end plates, the width of said passages being a multiple of the thickness of said holding member, said holding member in fully assembled condition of said end plates and of said discs and in the normal condition of said discs having an undulated contour with at least one undulation.

2. A buffer which includes: a first end plate, a second end plate arranged in substantially spaced relationship to said first end plate, a plurality of discs of cellular elastic material interposed between and bonded to said first and second end plates and also bonded to each other, said discs respectively being provided with axial passages substantially axially aligned with each other, and a holding member extending through said passages and interconnecting said end plates, the width of said passages being a multiple of the thickness of said holding member, said holding member being a band which with the buffer in fully assembled condition and in its normal expanded position being bent in accordion fashion.

3. A buffer according to claim 1, which includes a holding plate embedded in said first end plate, said holding member having one end connected to said holding plate.

4. A buffer according to claim 3, in which said first plate is a foamed plate and in which said holding plate is foamed in into said foamed plate, said holding plate being provided with perforations.

5. A buffer which includes: a first end plate, a second end plate arranged in substantially spaced relationship to said first end plate, a plurality of discs of cellular elastic material interposed between and bonded to said first and second end plates and also bonded to each other, said discs respectively being provided with axial passages substantially axially aligned with each other, and a holding member extending through said passages and interconnecting said end plates, the width of said passages being a multiple of the thickness of said holding member, that end portion of said holding member which is connected to said second end plate extending substantially therethrough and being connected thereto from that side of said second end plate which faces away from said first end plate.

* * * * *